Patented Dec. 8, 1953

2,662,048

UNITED STATES PATENT OFFICE 2,662,048

STABLE VITAMIN $B_{12}$-CONTAINING COMPOSITION

Walter A. Winsten, Forest Hills, N. Y.

No Drawing. Application December 19, 1950,
Serial No. 201,689

1 Claim. (Cl. 167—81)

This invention concerns aqueous vitamin compositions containing vitamin B-12 in which that vitamin has been substantially stabilized against destruction otherwise caused by other vitamins, notably ascorbic acid and thiamine. In such compositions vitamin B-12 has been protected from destruction caused by the aforementioned vitamins, by including in such compositions water soluble or colloidally dispersable cooperating vitamin B-12 stabilizers.

It is well known that vitamin B-12 is normally incompatible with ascorbic acid and is rapidly and completely destroyed by that substance when both are in aqueous solution. (See Gakenheimer et al., J. Amer. Pharm. Assoc., 38, 660, 1949, and Trenner et al., ibid., 39, No. 6, 1950.)

The destructive influence of thiamine on vitamin B-12 in aqueous solution was noted by Chow et al., at the 117th American Chemical Society meeting, April 9, 1950.

The present invention allows the incorporation of vitamin B-12 in aqueous polyvitamin compositions containing the fat soluble and other water soluble vitamins in true or colloidal solution. Such compositions up till now without vitamin B-12 as a constituent have enjoyed wide use in pediatrics and geriatrics since they permit easy administration of the vitamins to the children and aged. Thus aqueous polyvitamin preparations in use up to the present time were formulated to contain vitamins A and D, thiamine, riboflavin, ascorbic acid, niacinamide, pantothenic acid but not vitamin B-12. Prior to my invention it was not possible to add vitamin B-12 to polyvitamin preparations of the type mentioned due to the rapid destruction of vitamin B-12 caused by ascorbic acid and thiamine in such formulations.

I have found that by achieving a practical stabilization of vitamin B-12 in aqueous solutions against the destructive effects of ascorbic acid and thiamine, my invention permits one to formulate reasonably and sufficiently stable polyvitamin compositions containing the three vitamins among others in aqueous solution.

Before describing my invention it should be clear as to what is meant by vitamin B-12. This vitamin was discovered by Rickes et al. (Science, 107, 396, 1948). Vitamin B-12 is described in the United States Pharmacopoeia XIV.

In addition to vitamin B-12 another form of the vitamin called B-12b exists in nature. (See Brink et al. and Kaczka et al., Science, 112, 354, 1950.)

The structure of vitamin B-12 is not known exactly. It appears to be a cobalt coordination complex. Vitamin B-12 has been alternatively designated as cyano-cobalamin.

Crystalline vitamin B-12 of commerce often contains some vitamin B-12b in the preparation. The two forms of the vitamin are almost always found in crude oral grade solids containing about 500 micrograms of the combined forms of the vitamin per gram. Such crude grades are also available commercially.

In my invention crystalline vitamin B-12 or a mixture of B-12 and B-12b as occur in crude concentrates may be employed. However I prefer to use authentic vitamin B-12 itself since it is inherently more stable than B-12b. I also prefer to use a triturate of crystalline vitamin B-12 with sodium chloride which contains 0.1% of the vitamin, the residue being pure sodium chloride. Such a triturate is also available commercially. As indicated later in this specification I can also use certain special crude vitamin B-12 (and B-12b) preparations advantageously.

Total vitamin B-12 activity (due either to B-12, B-12b or both) may be assayed in pharmaceutical compositions microbiologically using a suitable strain of *Lactobacillus leichmannii* such as American Type Culture Collection No. 7830. The assay method has been described in the United States Pharmacopoeia collaborative vitamin B-12 microbial assay study for 1950.

In its broadest form the present invention comprises aqueous compositions containing in solution vitamin B-12, ascorbic acid and/or thiamine plus any other vitamins as may be desired together with certain cooperating vitamin B-12 stabilizers which substantially aid in protecting vitamin B-12 from destruction in such compositions, where such stabilizers are members of three groups of substances. Which cooperating vitamin B-12 stabilizers must be employed to secure effective stabilization depends largely on the nature of the particular aqueous composition in which vitamin B-12 is dissolved.

From a practical point of view it is a common characteristic of the aqueous vitamin compositions to which my invention applies that they all have a pH somewhere in the range of about 3.5 to 7.0, with a pH close to about 5 being preferred. Such aqueous compositions have in true solution or clearly colloidally dispersed vitamin B-12, ascorbic acid, and/or thiamine, and any other vitamins, including normally fat soluble vitamins, as desired.

I have discovered that if it is merely desired to stabilize vitamin B-12 in solution with ascorbic acid (neutralized to the pH range indicated above) in an aqueous composition, then a cooperating vitamin B-12 stabilizer belonging to a first group (group I) may be employed to aid in substantially stabilizing vitamin B-12 from destruction by ascorbic acid where group I consists of the class of non-ionic wetting agents which are the higher fatty acid partial esters of polyoxyalkylene derivatives of a hexitol anhydride. (See the booklet "Atlas Surface Active Agents," 1948 edition published by the Atlas Powder Company of Wilmington, Delaware.) The higher fatty acids used in the manufacture of these wetting agents are exemplified by such substances as oleic acid, lauric acid, and palmitic acid. The polyoxyalkylene residues of these wetting agents are generally polyoxyethylene residues. These have low toxicity. The hexitol anhydrides which are also portions of the wetting agent molecules are derived from hexahydric alcohols such as sorbitol, mannitol and ducitol and the like. The group I wetting agents which are preferred are the polyoxyethylene sorbitan higher fatty acid partial esters. These are known under the trade name of "Tweens." "Tween 20" is polyoxyethylene sorbitan monolaurate. "Tween 80" is poloxyethylene sorbitan monoleate.

I have discovered that as soon as one adds thiamine, with or without other vitamins to an aqueous solution containing vitamin B-12 and ascorbic acid, in order to stabilize vitamin B-12 substantially in such compositions, in addition to the necessity of using the group I non-ionic wetting agents mentioned above, one must use at least one member of each of two additional groups of cooperating vitamin B-12 stabilizers (groups II and III).

Before describing the nature of groups II and III it is desirable to point out that I have found the deleterious effect of thiamine itself on vitamin B-12 to be most apparent at pH 7.0 or at higher pH and is rather small at pH 4-5. Thus in many cases the destructive influence of vitamin B-1 (thiamine) in causing the destruction of vitamin B-12 in aqueous solution can be minimized by proper choice of pH. However while thiamine itself is not too destructive to vitamin B-12 at mildly acid pH, if thiamine is added to an aqueous composition containing in solution or clearly colloidally dispersed a group I non-ionic wetting agent, ascorbic acid, and vitamin B-12 at pH 4-5 for example, the addition of thiamine is instrumental in causing the destruction of vitamin B-12 contained therein. In order to effectively and substantially stabilize vitamin B-12 in aqueous compositions containing also dissolved ascorbic acid, and thiamine as well as polyoxyethylene sorbitan monolaurate, at a pH in the preferred range 4-5, it is necessary to add at least one member of group II and at least one member of group III as cooperating vitamin B-12 stabilizers.

The cooperating vitamin B-12 stabilizers which compose group II are members of the class of substances which contain chemical groups or radicals known to react with or form coordination complexes with cobalt. Group II thus includes sulphydryl (SH) containing compounds such as aminoacids or amino-acid derivatives which contain sulphydryl groups as for instance cysteine hydrochloride, glutathione, homocysteine, B,B-dimethyl-cysteine.

Group II also includes salts of anions such as chloride ion and thiocyanate ion which form coordination complexes with cobalt. By salts of these ions I mean alkali metal salts, the ammonium salt, also alkaline earth salts. It is the anion which is of importance and not the cation with which it may be associated.

While the group II cooperating vitamin B-12 stabilizers are those compounds known to react with or form coordination complexes with cobalt, I do not necessarily infer that in performing their protective function they react or coordinate with the cobalt atom which is known to be a part of the vitamin B-12 molecule; such a reaction might occur in the case of vitamin B-12b which is hydroxo-cobalamin (see Kaczka et al., Science 112, 354, 1950).

I also do not necessarily infer that it is by virtue of the conversion of vitamin B-12 to chlorcobalamin by chloride ion for example (see Kaczka et al. loc. cit.) that chloride ion aids in protecting vitamin B-12 against destruction. I have found that the concentration of chloride ion in the final aqueous vitamin composition must be quite high in comparison to the vitamin B-12 concentration, being several orders of magnitude greater than the equivalent vitamin B-12 concentration. Thus I require chloride ion concentrations as derived from sodium chloride present at 0.5 to 3% concentration in compositions containing from about 1 to 100 micrograms of vitamin B-12 per ml.

The cooperating vitamin B-12 stabilizers which compose group III are members of the class of water soluble salts of yeast nucleic acid. It is the nucleate portion of such salts which is important. Whether the sodium, potassium or ammonium or other soluble salt of nucleic acid is used is of no importance. It is merely important to have the nucleate radical in solution.

In place of nucleic acid salts I may use as alternative members of group III cooperating vitamin B-12 stabilizers, chlorophyll and water soluble derivatives of chlorophyll known as metallo-chlorophyllins. The metallo-chlorophyllins are manufactured by saponifying the chlorophyll to remove the methyl and phytyl groups. If sodium hydroxide is used to effect the saponification the sodium magnesium chlorophyllin is formed. The magnesium is derived from the original chlorophyll molecule, in which it occurs naturally. Chlorophyll A or B or mixtures thereof may be the starting material from which the metallo-chlorophyllins are derived. If desired the magnesium may be replaced by copper, cobalt, nickel or iron to produce sodium copper chlorophyllin, sodium nickel chlorophyllin, sodium cobalt chlorophyllin and sodium iron chlorophyllin. Potassium, ammonium or other soluble metallo-chlorophyllins may be employed. Of the group consisting of chlorophyll and the metallo-chlorophyllins I prefer to use the water soluble salts of the copper chlorophyllin, as sodium copper chlorophyllin. Sodium copper chlorophyllin is more stable than sodium magnesium chlorophyllin at pH 4-5 which is a favored pH range for polyvitamin preparations.

The use of salts of the metallo-chlorophyllins as Group III cooperating vitamin B-12 stabilizers is possible at pH 4-5 in aqueous compositions containing "Tweens" since these non-ionic wetting agents act to solubilize the metallo-chlorophyllins which would otherwise precipitate out of solution in the pH range indicated.

Group III also may be comprised alternatively of higher fatty acids such as lauric acid, oleic acid and stearic acid. Aliphatic fatty acids (either saturated, monoolefinic, or diolefinic) with a carbon chain of 8–22 atoms in length may be used.

Group III is seen to contain sub-groups of substances which appear to be unrelated. However I believe that they all operate by a somewhat similar mechanism in protecting vitamin B-12 from destruction by ascorbic acid and thiamine in aqueous solutions. Thus I believe that the comparatively high molecular weight nucleic acid salts and the high molecular weight chlorophyll derivatives in the presence of wetting agents such as those indicated as being members of the group I cooperating B-12 stabilizers are able to form complexes with vitamin B-12 in solution and are thereby instrumental in stabilizing the vitamin from destruction. When fatty acids are used as members of group III they can only be maintained in solution by the use of wetting agents. I believe that the fatty acids are clearly, colloidally dispersed in the aqueous compositions and that they are associated intimately with micelles of the wetting agents. I believe that such fatty acid micelle combinations are also able to form complexes with vitamin B-12 in solution thereby aiding in preventing the destruction of the vitamin.

Thus whenever vitamin B-12, ascorbic acid and thiamine (with or without other vitamins) are together in solution in aqueous compositions then in order to protect vitamin B-12 from destruction there must be included in solution or colloidally dispersed in the composition one or more members of group I, one or more members of group II and one or more members of group III as cooperating vitamin B-12 stabilizers.

The use of members of three groups of cooperating vitamin B-12 stabilizers is also more effective than the use of group I alone, even when thiamine is absent and only ascorbic acid and vitamin B-12 are present in solution.

However I have discovered that if as a group II cooperating vitamin B-12 stabilizer a sulphydryl group-containing compound is used, then the use of one or more members of group III is mandatory if vitamin B-12 is to be substantially stabilized. Sulphydryl compounds when added to aqueous compositions containing in solution or colloidally dispersed in an aqueous solution a "Tween," ascorbic acid and vitamin B-12, can cause the accelerated destruction of vitamin B-12 in such compositions. However this accelerated destruction does not take place if group III compounds are added as cooperating vitamin B-12 stabilizers. Indeed I have found that sulphydryl compounds which are normally destructive to vitamins in compositions as mentioned, only become cooperating vitamin B-12 stabilizers when used jointly with group III cooperating stabilizers. It is my discovery that while sulphydryl compounds per se are normally destructive to vitamin B-12 in aqueous compositions, they become important vitamin B-12 stabilizers when used jointly with group I and group III cooperating vitamin B-12 stabilizers.

Other members of group II as for example chloride-ion-containing salts are not destructive to vitamin B-12. These can be used jointly with group I agents to aid in protecting vitamin B-12 from destruction due to ascorbic acid.

My invention thus comprises substantially stabilizing vitamin B-12 against destruction due to ascorbic acid in aqueous compositions, at a pH in the range 3.5 to 7, a pH of 4–5 being preferred, by the use of group I wetting agents as cooperating vitamin B-12 stabilizers. This stabilization can be made more effective by also including one or more members of group II cooperating B-12 stabilizers and one or more members of group III cooperating vitamin B-12 stabilizers.

My invention also comprises substantially stabilizing vitamin B-12 in the presence of ascorbic acid in solution with other vitamins excepting thiamine, by the use of at least one member from each of the three groups of cooperating vitamin B-12 stabilizers.

My invention is also seen to comprise substantially stabilizing vitamin B-12 in the presence of ascorbic acid and thiamine in solution in aqueous compositions, with or without other vitamins being present, where stabilization is effected by the use of at least one member of each of the three groups of cooperating vitamin B-12 stabilizers.

Thus in aqueous compositions containing vitamin B-12 ascorbic acid and thiamine with or without other vitamins, I can employ polyoxyethylene sorbitan monolaurate or monooleate as the group I cooperating vitamin B-12 stabilizer. I can employ any one of the class of sulphydryl compounds or chloride salts or thiocyanate salts as the group II cooperating B-12 stabilizer. As a member of the group III cooperating stabilizers a water soluble, non-toxic salt of nucleic acid may be used, or chlorophyll, or a water soluble non-toxic metallo-chlorophyllin, or a higher fatty acid may be used.

While all such permutations and combinations as I can employ to aid the stabilization of vitamin B-12 are not equally effective, all do provide a high order of protection.

The sulphydryl compounds while very effective as cooperating vitamin B-12 stabilizers have a bad effect on the stability of thiamine and hence in polyvitamin compositions in which thiamine is an important constituent, their use is not favored.

Sodium copper chlorophyllin and other chlorophyllins are by themselves effective in substantially preventing the destruction of vitamin B-12 due to thiamine in aqueous solutions. Thus at pH 7.3 in six days at 45 degrees centigrade, 2 mg. of thiamine per ml. destroyed 99% of vitamin B-12 in solution. When 5 mg. per ml. of sodium copper chlorophyllin (grade WCM-50, produced by the American Chlorophyll Company of Lake Worth, Florida) was present in solution only 20% of the vitamin B-12 was lost in a similar storage test.

The compositions of the invention may be illustrated by, but not restricted to the following:

*Example 1*

A solution was prepared as follows. 3 grams of ascorbic acid was dissolved in 10 ml. of water. Enough 20% sodium hydroxide was added to raise the pH to 5.0. The solution was diluted to 21 ml. with water and then 9 ml. of "Tween 20" was added as a group I cooperating vitamin B-12 stabilizer. To 5 ml. of the solution so prepared was added 0.5 ml. of an aqueous solution in which was dissolved 50 mg. of a sodium chloride triturate of crystalline vitamin B-12 (from Merck & Co., Rahway, N. J.). The triturate contained 0.1% of crystalline vitamin B-12 by weight. Thus the 0.5 ml. solution of the B-12 sodium chloride triturate contained 50 micrograms of the vitamin and practically 50 mg. of salt which is an example of a group II cooperating vitamin B-12 stabilizer. The final mixture contained in solution per ml., 9.1 micrograms of vitamin B-12, 91 mg. of ascorbic acid and 9.1 mg of sodium chloride. The final concentration of "Tween 20" in the aqueous composition was about 28% by volume.

*Example 2*

To 5 ml. of a solution containing 100 mg. of ascorbic acid per ml., neutralized to pH 5.0 and containing 30% by volume of "Tween 20" as in Example 1 above, was added 0.5 ml. of water containing in solution 50 mg. of sodium chloride triturate of crystalline vitamin B-12 representing 50 micrograms of the vitamin. The 0.5 ml. of B-12 solution also contained 25 mg. of cysteine hydrochloride and 10 mg. of thiamine hydrochloride. The cysteine hydrochloride is a member of the group II cooperating vitamin B-12 stabilizers as is the sodium chloride in the B-12 triturate. As a member of the group III cooperating vitamin B-12 stabilizers there was added 25 mg. of sodium copper chlorophyllin (grade WCM-75, American Chlorophyll Company) dissolved in 0.5 ml. of water.

Examples 3-11 given below were formulated utilizing as a part of the aqueous compositions certain commercial aqueous polyvitamin drops purchased on the open market. The product used is known as ("Vi-syneral Vitamin Drops") and is manufactured by the U. S. Vitamin Corp. located in New York city. This product is manufactured according to a patent of Freedman and Green, U. S. 2,417,229 (issued March 11, 1947) disclosing the use of polyoxyethylene sorbitan fatty acid esters for solubilizing substantially fat free oil soluble vitamins in aqueous solutions.

In the manufacture of "Vi-syneral Vitamin Drops" "Tween 20" is used, although other related wetting agents may also be employed. The drops contain in each 0.6 cc. at least 5000 USP units of vitamin A, 1000 USP units of vitamin D, 50 mg. of vitamin C (ascorbic acid), 1 mg. of vitamin B-1 (thiamine), 0.4 mg. of vitamin B-2 (riboflavin), 0.1 mg. of vitamin B-6, 5 mg. of niacinamide, 2 mg. of pantothenic acid. Some glycerine, water and sorbitan laurate derivative ("Tween 20") are included although the exact amounts are not indicated by the manufacturer.

In Examples 3-11 (except Example 9), to each 15 ml. of the commercial vitamin drops indicated above was added aqueous supplements totaling 1.5 ml. in volume containing in solution vitamin B-12, and different protective agents comprising group II and group III cooperating vitamin B-12 stabilizers. The "Tween 20" in the commercial vitamin drops served as the group I cooperating vitamin B-12 stabilizer.

I found that when to 15 ml. of the commercial vitamin drops, 1.5 ml. of water containing in solution 150 mg. of Merck's vitamin B-12 sodium chloride triturate representing 150 micrograms of the vitamin was added, almost 100% of the vitamin was destroyed after storage in a closed bottle for 21 days at 45 degrees centigrade, an accelerated storage test. This destruction of the vitamin B-12 added to the "Vi-syneral Vitamin Drops" was due to the influence of the ascorbic acid and thiamine in the preparation.

The aqueous polyvitamin compositions formulated in Examples 3-11 were also stored in closed vials at 45 degrees centigrade. After no less than 30 days and up to 60 days in some examples, 50-100% of the vitamin B-12 originally present in the compositions was found to be retained. In many of the examples the retention was about 70-85%, after storage at 45 degrees centigrade for 33 days.

*Example 3*

To 1.0 ml. of water was added 150 mg. of a sodium chloride triturate of crystalline vitamin B-12 representing 150 micrograms of the vitamin. 500 mg. of sodium nucleate (from the Schwarz Laboratories of New York city) was stirred into the solution. Then 15 ml. of the commercial vitamin drops ("Vi-syneral") was stirred in to give a clear appearing solution. 0.5 ml. of water containing 100 mg. of dissolved cysteine hydrochloride was then stirred in. The resulting aqueous composition had a pH of about 4.9.

*Example 4*

To 1.0 ml. of water was added 75 mg. of sodium copper chlorophyllin (grade WCM-75, American Chlorophyll Company). The water was heated and stirred gently to promote solution of the chlorophyllin. 75 mg. of sodium chloride triturate of crystalline vitamin B-12 representing 75 micrograms of the vitamin was stirred into the solution. Then 15 ml. of commercial vitamin drops were stirred in to give a deep green composition. Finally 0.5 ml. of water containing 100 mg. of cysteine hydrochloride in solution was added. The final polyvitamin aqueous composition had a pH of about 4.9.

*Example 5*

To 1 ml. of water containing in solution 75 mg. of sodium copper chlorophyllin was added 0.5 ml. of water containing in solution 150 mg. of a sodium chloride triturate of crystalline vitamin B-12 representing 150 micrograms of the vitamin. An additional 150 mg. of sodium chloride itself was then dissolved in the solution. 15 ml. of commercial vitamin drops were then stirred in to produce the final aqueous composition.

*Example 6*

To 1 ml. of water containing in solution 75 mg. of sodium copper chlorophyllin, 0.5 ml. of water containing in solution 150 mg. of a sodium chloride triturate of crystalline vitamin B-12 representing 150 micrograms of the vitamin, and also containing in solution 150 mg. of potassium thiocyanate, was added. 15 ml. of commercial vitamin drops was stirred in to produce the final aqueous polyvitamin composition.

*Example 7*

To 1 ml. of water was added 500 mg. of sodium nucleate. After stirring to dissolve the sodium nucleate, 0.5 ml. of water containing in solution 150 mg. of a sodium chloride triturate of crystalline vitamin B-12 representing 150 micrograms of the vitamin, and also containing in solution 150 mg. of potassium thiocyanate was added. 15 ml. of commercial vitamin drops was stirred in to produce a clear aqueous composition with a pH of about 4.9.

*Example 8*

To 1 ml. of water 500 mg. of sodium nucleate was added and the mixture was stirred to dissolve the nucleate. 0.5 ml. of water containing in solution 150 mg. of sodium chloride triturate of crystalline vitamin B-12 representing 150 micrograms of the vitamin and also containing in solution 150 mg. of potassium chloride, was added. Then 15 ml. of commercial vitamin drops was stirred in to give a clear aqueous composition.

Example 9

To 5 ml. of commercial vitamin drops was added 0.2 ml. of a solution of vitamin B-12 sodium chloride triturate of the type mentioned in previous examples, containing 5 micrograms of the vitamin. 0.25 ml. of water containing 50 mg. of glutathione (reduced form) in solution was added. The entire resulting clear aqueous composition was then added to a solution of 25 mg. of sodium copper chlorophyllin in 0.25 ml. of water to produce the final composition.

Example 10

To 1 ml. of water containing in solution 150 mg. of sodium chloride triturate of crystalline vitamin B-12 representing 150 micrograms of the vitamin was added with stirring 15 ml. of commercial vitamin drops. To the clear composition, was added 0.16 ml. of oleic acid. Not quite all the oleic acid dissolved. The final pH was about 4.9.

Example 11

3.0 grams of lauric acid was dissolved in 10 grams of "Tween 20" by heating. 20 ml. of water was stirred into the mixture. One gram of the gel-like composition was added to 15 ml. of commercial vitamin drops. The resulting aqueous composition was opalescent. 1 ml. of water containing in solution 150 micrograms of vitamin B-12 derived from 150 mg. of a sodium chloride triturate of the crystalline B-12 was added to produce the final composition.

In the examples given above crystalline vitamin B-12 was used as a sodium chloride triturate. The present invention, as stated earlier, permits the use of all the forms of vitamin B-12 available commercially. There are certain vitamin B-12 and B-12b concentrates, which contain about 0.05% by weight or less of the different forms of the vitamin which appear to contain an unknown factor or factors which permit one to dispense with the need for the group II cooperative vitamin B-12 stabilizers, if sufficiently high concentrations of B-12 derived from such concentrates are incorporated into aqueous polyvitamin compositions of the general type considered in this specification, which contain at least the vitamins ascorbic acid and thiamine. However even with such crude vitamin B-12 preparations the use of the group I and group III cooperative vitamin B-12 stabilizers is still necessary, if the vitamin B-12 is to be stabilized against the destruction caused by ascorbic acid and thiamine in aqueous compositions.

The unknown factor or factors occur in crude vitamin B-12 concentrates derived from Bacillus megatherium fermentations, also in cencentrates derived from anerobic bacterial fermentations of the type described by Hodge et al. (Abstracts, page 21a, 118th American Chemical Society Meeting, Sept. 3, 1950), also in concentrates derived from fermentations which produce the antibiotics streptomycin, aureomycin, and terramycin. The amounts of the unknown factor or factors which replace the need for the group II vitamin B-12 stabilizers varies widely from preparation to preparation. As a consequence it is expedient to include group II stabilizers along with groups I and III stabilizers when formulating aqueous polyvitamin compositions containing ascorbic acid and thiamine.

I claim:

An aqueous vitamin composition comprising an aqueous solution of ascorbic acid, thiamine, and vitamin B-12, and as cooperating vitamin B-12 stabilizers, a higher fatty acid partial ester of a polyoxyalkylene derivative of a hexitol anhydride, sodium chloride, and the sodium salt of yeast nucleic acid.

WALTER A. WINSTEN.

References Cited in the file of this patent

UNITED STATES PATENTS

| Number | Name | Date |
|---|---|---|
| 2,417,299 | Freedman | Mar. 11, 1947 |
| 2,530,416 | Wolf | Nov. 21, 1950 |

OTHER REFERENCES

U. S. Dispensatory, 24th Edition (1947), pages 1533, 1534.

Journal of the American Pharmaceutical Association, Practical Pharmacy Edition, October 1950, page 594.

Lang, Federation Proceedings, March 1950, pages 193, 194.

Girdwood, Lancet, August 20, 1949, page 346.

Gakenheimer, Journal of the American Pharmaceutical Association, Sci. Ed., December 1949, page 660.

U. S. Dispensatory, 24th Edition (1947), page 1400.